US009528596B2

(12) United States Patent
Konruff

(10) Patent No.: US 9,528,596 B2
(45) Date of Patent: Dec. 27, 2016

(54) GEAR BOX WITH CLUTCH HAVING SPRING ENGAGEMENT AND HYDRAULIC DISENGAGEMENT

(71) Applicant: Baldor Electric Company, Fort Smith, AR (US)

(72) Inventor: Michael E. Konruff, Simpsonville, SC (US)

(73) Assignee: Baldor Electric Company, Fort Smith, AR (US)

( * ) Notice: Subject to any disclaimer, the term of this patent is extended or adjusted under 35 U.S.C. 154(b) by 198 days.

(21) Appl. No.: 14/453,034

(22) Filed: Aug. 6, 2014

(65) Prior Publication Data
US 2016/0040777 A1 Feb. 11, 2016

(51) Int. Cl.
  F16D 55/38 (2006.01)
  F16H 57/10 (2006.01)
  F16H 57/04 (2010.01)
  F16D 55/24 (2006.01)
  F16D 25/0638 (2006.01)

(52) U.S. Cl.
  CPC ............ *F16H 57/10* (2013.01); *F16D 55/24* (2013.01); *F16D 55/38* (2013.01); *F16H 57/0473* (2013.01); *F16D 25/0638* (2013.01)

(58) Field of Classification Search
  None
  See application file for complete search history.

(56) References Cited

U.S. PATENT DOCUMENTS

| 1,299,156 A | 4/1919 | Fast |
| 2,277,738 A | 3/1942 | Wilkinson |
| 2,472,559 A * | 6/1949 | Arnold .................... F16H 57/10 |
| | | 188/366 |
| 3,223,197 A | 12/1965 | Conover |
| 3,321,999 A | 5/1967 | Greer |

(Continued)

FOREIGN PATENT DOCUMENTS

EP  0164968 A1  12/1985

OTHER PUBLICATIONS

Co-Pending U.S. Appl. No. 14/333,667, filed Jul. 17, 2014, Inventors: Konruff, M.; Russell, C.; Nguyen, C., (Not Yet Published).

(Continued)

*Primary Examiner* — Justin Holmes
(74) *Attorney, Agent, or Firm* — Thompson Coburn LLP

(57) ABSTRACT

A gear box has a clutch comprising a hub and a coupling, each having drive portions that are movable between engaged and disengaged positions. In the engaged position, the hub and coupling drive portions are engaged in a manner to allow torque to be transmitted between the hub and the coupling. In the disengaged position, the hub and coupling drive portions are spaced apart in a manner to prevent torque from being transmitted between the hub and the coupling. The clutch has an actuator that moves the hub and coupling drive portions between the engaged and disengaged positions. In moving the hub and coupling drive portions to the engaged position, the actuator is driven by spring pressure. In moving the hub and coupling drive portions to the disengaged position, the actuator is driven by hydraulic pressure supplied against the actuator sufficient to overcome the spring pressure.

24 Claims, 5 Drawing Sheets

(56) References Cited

U.S. PATENT DOCUMENTS

| | | | |
|---|---|---|---|
| 3,765,636 | A | 10/1973 | Burrell et al. |
| 4,324,213 | A | 4/1982 | Kasting et al. |
| 4,590,820 | A | 5/1986 | Hambric |
| 4,607,730 | A * | 8/1986 | Paisley ............... B60T 13/22 188/170 |
| 4,655,326 | A | 4/1987 | Osenbaugh |
| 4,738,111 | A | 4/1988 | Edwards |
| 4,957,187 | A | 9/1990 | Burgess |
| 5,004,535 | A | 4/1991 | Bosko et al. |
| 5,092,553 | A | 3/1992 | Joosse et al. |
| 5,125,376 | A | 6/1992 | Williams et al. |
| 5,446,326 | A | 8/1995 | Scheider |
| 5,567,306 | A | 10/1996 | DeWachter |
| 5,771,854 | A | 6/1998 | Barton |
| 5,967,929 | A | 10/1999 | Matsuoka et al. |
| 6,202,814 | B1 | 3/2001 | Braford, Jr. |
| 6,834,634 | B2 | 12/2004 | Lawrence |
| 7,513,172 | B2 | 4/2009 | Takahashi et al. |
| 7,966,979 | B2 | 6/2011 | Olsen et al. |
| 8,025,601 | B2 | 9/2011 | Iwasaki et al. |
| 8,267,826 | B2 | 9/2012 | Duong et al. |
| 8,562,480 | B1 * | 10/2013 | Mellet ................. F16H 3/725 475/317 |
| 8,601,997 | B2 | 12/2013 | Cockerill et al. |
| 8,702,373 | B1 | 4/2014 | Valva et al. |
| 9,222,383 | B2 | 12/2015 | Togo |
| 2007/0034458 | A1 * | 2/2007 | Rogers ................. F16D 55/38 188/71.4 |
| 2007/0197339 | A1 | 8/2007 | Ryymin et al. |
| 2009/0159038 | A1 | 6/2009 | Koyama et al. |
| 2009/0179387 | A1 | 7/2009 | Saenz De Ugarte et al. |
| 2010/0179011 | A1 | 7/2010 | Demtroder et al. |
| 2010/0304912 | A1 | 12/2010 | Sime |
| 2012/0108380 | A1 | 5/2012 | Dinter et al. |
| 2013/0035190 | A1 | 2/2013 | McCune |
| 2013/0095974 | A1 | 4/2013 | Imai et al. |
| 2013/0319006 | A1 | 12/2013 | Parnin et al. |
| 2014/0041619 | A1 | 2/2014 | Yamauchi |

OTHER PUBLICATIONS

Co-Pending U.S. Appl. No. 14/457,649, filed Aug. 12, 2014, Inventors: Esterle, T.; Konruff, M.; Nguyen, C.; Russell, C.; Asher, J., (Not Yet Published).

Co-Pending U.S. Appl. No. 14/333,703, filed Jul. 17, 2014, Inventors: Konruff, M.; Nguyen, C., (Not Yet Published).

Co-Pending U.S. Appl. No. 14/477,166, filed Sep. 4, 2014, Inventors: Konruff, M.; Nguyen, C.; Russell, C.; Asher, J.; Dejong, J.; Esterle, T., (Not Yet Published).

Co-Pending U.S. Appl. No. 29/500,903, filed Aug. 29, 2014, Inventors: Nguyen, C., (Not Yet Published).

* cited by examiner

GEAR BOX WITH CLUTCH HAVING SPRING ENGAGEMENT AND HYDRAULIC DISENGAGEMENT

SUMMARY

This disclosure relates to a clutch for a gear box that is driven by a motor. In one aspect, the disclosure relates to a clutch system associated with a planetary gear train used in a vertical gear motor application. In one type of vertical gear motor application, a motor, for instance, an AC induction or synchronous motor, may be directly mounted to a housing structure and connected to the gear train in the housing with a flexible coupling. In one aspect, the planetary gear system may have four major components. A sun gear may be used to provide high-speed input to the gear train. Around the sun gear, planet gears may be arranged. The planet gears may be supported by a planet carrier. The planet carrier may be connected to a low-speed output and the driven equipment. The entire planet gear carrier assembly (i.e., sun gear, planet gears, and planet carrier) may rotate inside a ring gear. The gear carrier may then drive the driven load through an output shaft. The shafts and gears of the planetary gear system may be made of high-alloy hardened and carburized steel for durability and strength. The gears may be double helical type gears for low noise and low vibration. The planetary gear system may be a single-stage reduction, for instance, 3:1 to 9:1. Speed control of the planetary gear system may be accomplished through a clutch assembly associated with the gear system. The gear train divides the power into multiple paths to reduce the load on individual gearing, affording high-power density and high efficiency. The clutch assembly controls the speed of the driven equipment to enhance system operation. For instance, the clutch assembly allows the motor to achieve motor base speed under a no-load condition. The clutch assembly can then be engaged and controlled to gradually bring the driven load to full speed. For instance, after the motor is started, the clutch may be engaged slowly to accelerate the load under a controlled acceleration curve, minimizing the impact on the power system and allowing for extended acceleration and deceleration times. In another aspect, the clutch functions as a mechanical overload protection device that protects the driven equipment and gearbox rotating components during operation in the event the driven load stops, for example, the driven load becomes jammed. In another aspect, the driven equipment may be started and stopped repeatedly by engaging and disengaging the clutch without stopping the motor.

DETAILED DESCRIPTION

Figure 1:
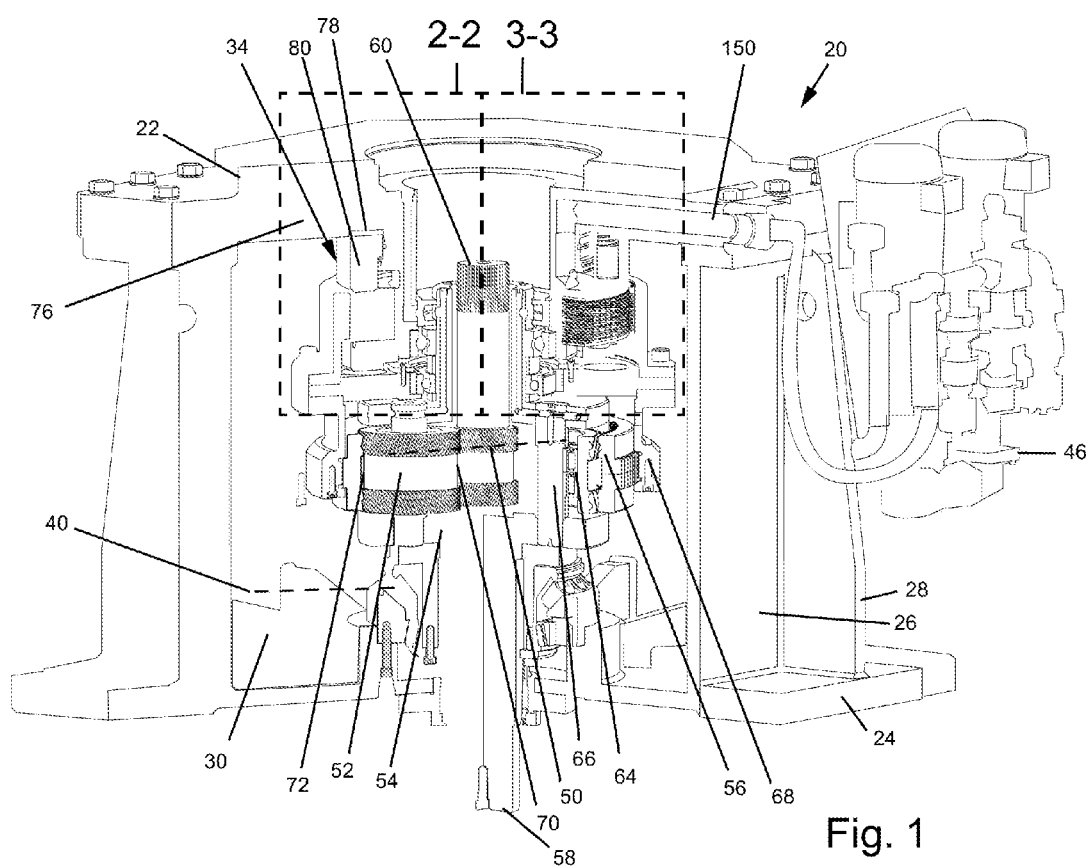
FIG. 1 shows a housing and planetary gear system including a clutch assembly with certain features of the housing and gear system shown cut away for ease of illustration.

The housing 20 containing the planetary gear train may comprise a fabricated steel housing including a top weldment plate 22 which provides a mount for a motor (not shown). Opposite the top weldment plate 22, the housing may be provided with a base weldment plate 24. The base weldment plate 24 may provide a mount to a driven load (not show), for instance, a pump. Between the top and base weldment plates 22,24, side walls 26 are provided. Together the top weldment plate 22, base weldment plate 24, and side walls 26 define a hollow interior of the housing 20 in which the planetary gear system is disposed. The housing 20 may also have side flanges 28 extending between the top weldment plate 22 and base weldment plate 24 to provide structural support for the side walls 26. Within the interior of the housing, the housing may be provided with gussets to provide additional structural support. The housing is provided with lower interior gussets 30 extending between the base weldment plate 24 and the side walls 26. The lower interior gussets 30 may extend in a radial pattern across the base weldment plate. The housing may also be provided with upper interior gussets (not shown) that extend between the top weldment plate 22 and the side walls 26. The planetary gear train may be interfaced with a clutch assembly 34. The clutch assembly 34 may extend into the interior of the housing from the top weldment plate 22.

A portion of the interior of the housing 20 may form a sump 40 for a lubrication system of the planetary gear train. Oil supply, filtration and pressurizing equipment 46 may communicate with the interior of the housing through connections in the structural members of the housing. For instance, oil from the oil supply, filtration and pressurizing equipment 46 may be directed through the top weldment plate 22. The oil supply, filtration and pressurizing equipment 46 may be provided adjacent to an exterior side wall 26 of the housing.

As mentioned earlier, in one aspect, the planetary gear system may have four major components. A sun pinion 50 may be used to provide high-speed input to the gear train. Around the sun gear 50, planet gears 52 may be arranged with the sun pinion driving the planetary gears. The planet gears 52 may be supported by a planet carrier 54. The entire planet gear carrier assembly (i.e., sun gear, planet gears, and planet carrier) may rotate inside a ring gear 56. The planet carrier 54 may be connected to a low-speed output and the driven equipment through an output shaft 58. The planet gear carrier 54 may be integrally or monolithically connected with the output shaft 58. The sun pinion 50 may be driven by an input shaft 60. Opposite the sun pinion 50, the input shaft 60 may be splined and connected to the motor (not shown) via a motor coupling hub (not shown). The sun pinion 50 may be spaced from the motor coupling hub along the input shaft 60. The gear system may include three planet gears that may be rotatably mounted to the planet gear carrier 54. The planet gears 52 may have planet gear bearings 64 that are mounted to planet gear spindles 66. The planet gear spindles 66 may be mounted to the planet gear carrier 54, and the planet gears 52 may rotate relative thereto via the planet gear bearings 64. The ring gear 56 may be mounted to a ring gear carrier 68 which surrounds the planet gears 52 and sun pinion 50. The ring gear carrier 68 may be supported in the hollow interior of the housing as explained below in greater detail. The sun pinion 50 may engage with each of the planet gears 52 at a respective sun planet gear mesh 70, and each of the planet gears 52 may engage with the ring gear 56 at a respective planet ring gear mesh 72.

The clutch assembly 34 may include a piston carrier 76 which may be mounted on a bottom surface of the top weldment plate 22 or other structural member of the housing depending upon the application. The piston carrier 76 may have an annular groove 78 in which a piston 80 of the clutch moves in a reciprocating fashion, for instance, vertically up and down in the drawing figures. The piston 80 may be formed as an annular ring with an axial end 82 facing the piston carrier and an axially opposite end 84 applying pressure to engage the clutch 34. Inner and outer diameters of the piston extend between the piston carrier facing axial end 82 and piston pressure application axial end 84. The outer diameter 86 of the piston may be a generally cylindrical surface. The piston inner diameter may be formed with first and second wall surfaces 90,92. The piston inner diameter first wall surface 90 may be formed such that it is spaced radially inward from the second wall surface 92. A shoulder 94 may extend between the first (i.e., radially inward) wall surface 90 and the second (i.e., radially outward) wall surface 92. The shoulder 94 extending between the first wall surface 90 and the second wall surface 92 may be flat and may define a plane generally parallel to axial ends 82,84 of the piston. The piston 80 may have plurality of recesses 96 (FIG. 3) circumferentially spaced about the piston formed through the carrier facing axial end 82 into the interior of the piston. Each recess 96 may contain a spring 98 and a spring retainer 100. The spring retainer 100 may be disposed in the recess 96 with the spring 98 acting between the spring retainer 100 and the piston carrier annular groove 78. The spring 98 may be arranged to urge the piston 80 away from the piston carrier 76, i.e., downward in the drawing figures. The spring 98 may be confined in compression in the recess 96, as explained below in more detail. While a plurality of springs disposed in a plurality of recesses is shown in the drawings, the piston may be driven by one coil spring or any number of springs, and such a spring or springs may be disposed in an annular groove of the piston.

A spline hub 102 may depend from the piston carrier 76, or another structural member of the housing, into the interior of the housing. The spline hub 102 may have an inner diameter 104 that generally surrounds the gear box input shaft 60 and the upper most portion of the planet carrier 54. An outer diameter of an upper most part of the spline hub 102 may have a geometry that cooperates with the inner diameter of the piston 80. The outer diameter of the upper most part of the spline hub may have first and second wall surfaces 106,108. The spline hub outer diameter first wall surface 106 may be formed such that it is spaced radially inward from the second wall surface 108. A shoulder 110 may extend between the hub outer diameter first (i.e., radially inward) wall surface 106 and the second (i.e., radially outward) wall surface 108. The spline hub second wall surface 108 may be circumsubjacent to the piston inner diameter second wall surface 92, and the spline hub first wall surface 106 may be circumsubjacent to the piston inner diameter first wall surface 90. The spline hub shoulder 110 may face the piston shoulder 94, and may also define a plane parallel to the piston axial ends 82,84. The spline hub shoulder 110 and the piston shoulder 94, and the respective portions of the piston inner diameter second wall surface 92 and spline hub outer diameter first wall surface 106 may define a hydraulic fluid chamber 112. With the spline hub 102 fixedly mounted to the housing 20, pressurized hydraulic fluid in the hydraulic chamber 112 may allow the piston 80 to move relative to the spline hub. Seals 114 may be provided between the respective spline hub first and second wall surfaces 106,108 and piston inner diameter first and second wall surfaces 90,92 to seal the hydraulic fluid chamber 112. For instance, the spline hub first wall surface 106 may be formed with an annular seal groove for locating the seal 114 between the first wall surfaces 90,106 of the piston inner diameter and the spline hub outer diameter. The spline hub second wall surface 108 may be formed with an annular seal groove for locating the other seal 114 between the second wall surfaces 92,108 of the piston inner diameter and the spline hub outer diameter. The seals 114 may be four-lipped ring type seals, for instance, Quad-Ring™ supplied by Quadion, LLC. While the drawings show the hydraulic chamber located between the respective shoulders, and first and second wall surfaces of the piston and the spline hub, the hydraulic fluid chamber may be located elsewhere, for instance, on an axial end of the piston. In the alternative, the relative orientation of the hub and the piston may be reversed so that the hub is circumsuperjacent to the piston, and consequently the hub is formed with its inner diameter having an radially outward wall surface which is circumsuperjacent to the piston outer diameter radially outward wall surface, and an radially inward wall surface which is circumsuperjacent to the piston outer diameter radially inward wall portion. In this configuration, the spline hub shoulder and the piston shoulder, and the respective portions of the piston outer diameter and spline hub inner diameter may define a hydraulic fluid chamber.

Pressurized hydraulic fluid may be provided to the hydraulic chamber 112 to move the piston 80. The hydraulic fluid may be supplied from a pump and reservoir (not shown) external to the housing 20. In the configuration shown in the drawings, the piston 80 has radial ports 116,118 extending from an outer diameter 86 of the piston inward to the piston inner diameter outer wall surface 92 between the seals 114. A port 118 may be provided for supplying high pressure hydraulic fluid to the chamber 112 and a port 116 may be provided for relieving hydraulic fluid from the chamber. The ports 116,118 may be diametrically spaced apart from each other on the outer diameter of the piston. The supply port 118 may direct hydraulic fluid to the hydraulic chamber 112 defined between the respective shoulders 94,110 of the piston 80 and spline hub 102, and the spline hub first wall surface 106 and the piston second wall surface 92. Directing high-pressure hydraulic fluid into the hydraulic chamber 112 allows the piston 80 to move against spring pressure into the piston carrier annular groove 78. Relieving hydraulic pressure from the hydraulic chamber 112 allow the piston 80 to move under spring pressure out of the piston carrier annular groove 78. While the drawings show the piston having hydraulic fluid ports communicating with the hydraulic chamber, depending upon the configuration of the hub and the piston (for instance, an orientation where the hub is circumsuperjacent to the piston), the hub may have the hydraulic ports rather than the piston.

Below the first and second wall surfaces 106,108 of the spline hub 102, a mid to bottom portion of the spline hub may have an outer diameter with spline teeth 120. The teeth 120 may be spaced circumferentially about the spline hub 102. Each tooth 120 may extend axially along the outer diameter of the spline hub mid to bottom portion. A bottom portion of the spline hub 102 may have an inner diameter that provides a mounting location for a radial bearing 122 between the spline hub and the planet carrier 54. The spline hub 102 may have a keeper plate 124 mounted to its bottom. The keeper plate 124 may extend radially outward so that is below and axially spaced from the pressure application end 84 of the piston 80.

A spline coupling 130 is arranged radially outward and spaced away from the spline hub 102. The spline coupling 130 may be a generally cylindrical member with a generally cylindrical outer diameter 132, and an inner diameter with spline teeth 134. The spline teeth 134 may be spaced circumferentially about the inner diameter of the spline coupling 130. Each tooth 134 may extend axially along the inner diameter. The spline coupling 130 may have an outwardly extending flange 136 which forms a mounting surface for connection to a bearing carrier 138. The bearing carrier 138 may extend radially inward towards the planet carrier 54. The bearing carrier 138 may be supported at its inner diameter by a radial bearing 140 mounted between the bearing carrier and the planet carrier 54. The spline coupling 130 may be supported in the interior of the housing by the bearing carrier 138. The bearing carrier 138 may support the ring gear carrier 68 below the spline coupling 130. The ring gear carrier 68 may support the ring gear 56 of the planetary gear system.

Figure 5:
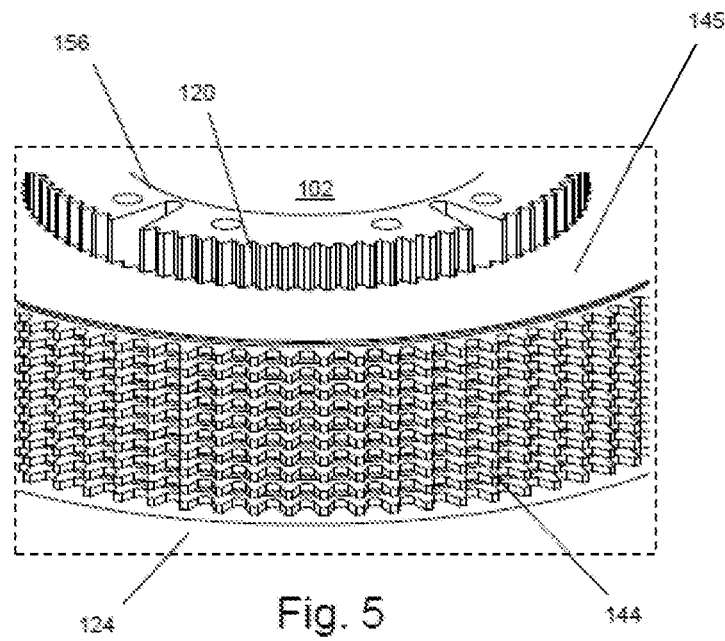
FIG. 5 shows a partial perspective view of a spline hub of the clutch assembly.
Figure 6:
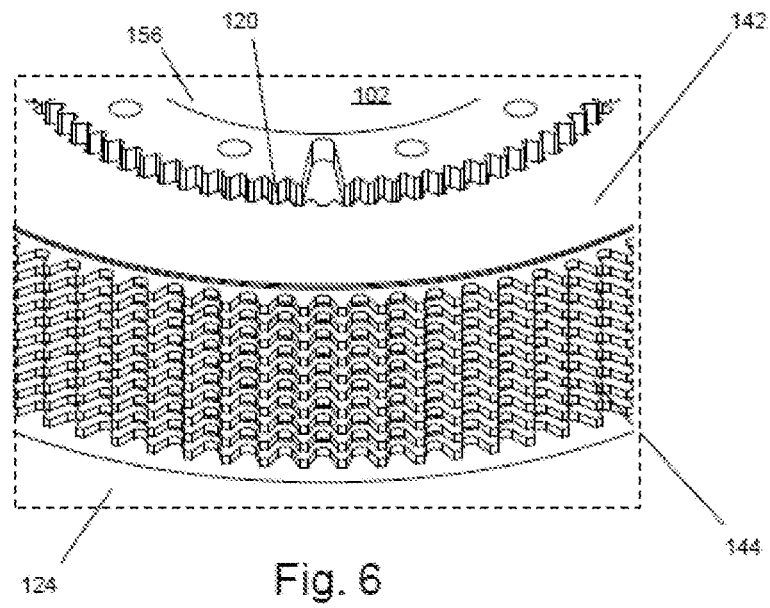
FIG. 6 shows an alternate, partial perspective view of a spline hub of the clutch assembly.

The spline coupling 130 and the spline hub 102 may each be provided with drive portions 142,144 for transmitting torque therebetween. For instance, the drive portions may comprise a plurality of clutch plates arranged in a stack disposed between the pressure application end 84 of the piston and the clutch assembly keeper plate 124. Referring to FIGS. 5 and 6, one set of clutch plates 142 in the stack of clutch plate may have an annular outer diameter surface with splines formed on its inner diameter surface, and another set of clutch plates 144 in the stack of clutch may have splines formed on its outer diameter surface with an annular inner diameter surface. The clutch plates 142 having splines on their inner diameter surfaces may be arranged to engage the spline teeth 120 of the spline hub 102. The set of clutch plates 144 having splines on an outer diameter surface may be arranged to engage the spline teeth 134 of the spline coupling 130. The clutch plates 144 that engage the spline coupling 130 may have friction material 145 disposed on their axial sides. The clutch plates 142 that engage the spline hub 102 may be generally flat and have their surfaces untreated. The clutch plates 142 that engage the spline hub 102 may be stationary during engagement and disengagement of the clutch 34. The clutch plates 144 which engage the spline coupling 130 may rotate when the clutch 34 is not engaged and may become stationary when the clutch is engaged. The aforementioned sets of clutch plates 142,144 may arranged in an alternating pattern in the clutch plate stack between the piston 80 and the keeper plate 124. A pressure plate 146 may be disposed between the clutch plate stack and pressure application end 84 of the piston 80. A second pressure plate 148 may be disposed between the keeper plate 124 and the clutch plate stack. One clutch plate for the spline hub and one clutch plate for the spline coupling may be provided, or any number of clutch plates may be provided.

The piston 80 may operate on the drive portions 142,144 to move the hub drive portion and the coupling drive portion between an engaged position and a disengaged position. For instance, in moving the hub drive portion 142 and the coupling drive portion 144 to the engaged position, the piston 80 may be driven by pressure exerted by the spring 98. In the engaged position, the clutch plates 142,144 in the stack may be compressed and frictionally engaged on their respective axial sides to allow torque to be transmitted from the spline hub 102 to the spline coupling 130. This in turn may prevent the ring gear 56 from rotation and may allow the output shaft 58 to rotate if the gear box input shaft 60 is rotating, e.g., when the motor is energized. In the disengaged position, the clutch plates 142,144 in the stack are released from compression by the piston to prevent torque from being transmitted from the spline hub 102 to the spline coupling 130. This in turn may allow the ring gear 56 to rotate and may prevent the output shaft 58 from rotation, even if the gear box input shaft 60 is rotating, e.g., when the motor is energized but the clutch is disengaged to idle the load. The piston 80 may be actuated to effect incremental movement between the engaged and disengaged position to allow various amounts of slip therebetween and consequently various levels of torque to be transmitted between the spline hub 102 and the spline coupling 130. This allows for variable speed and torque control.

Figure 2:
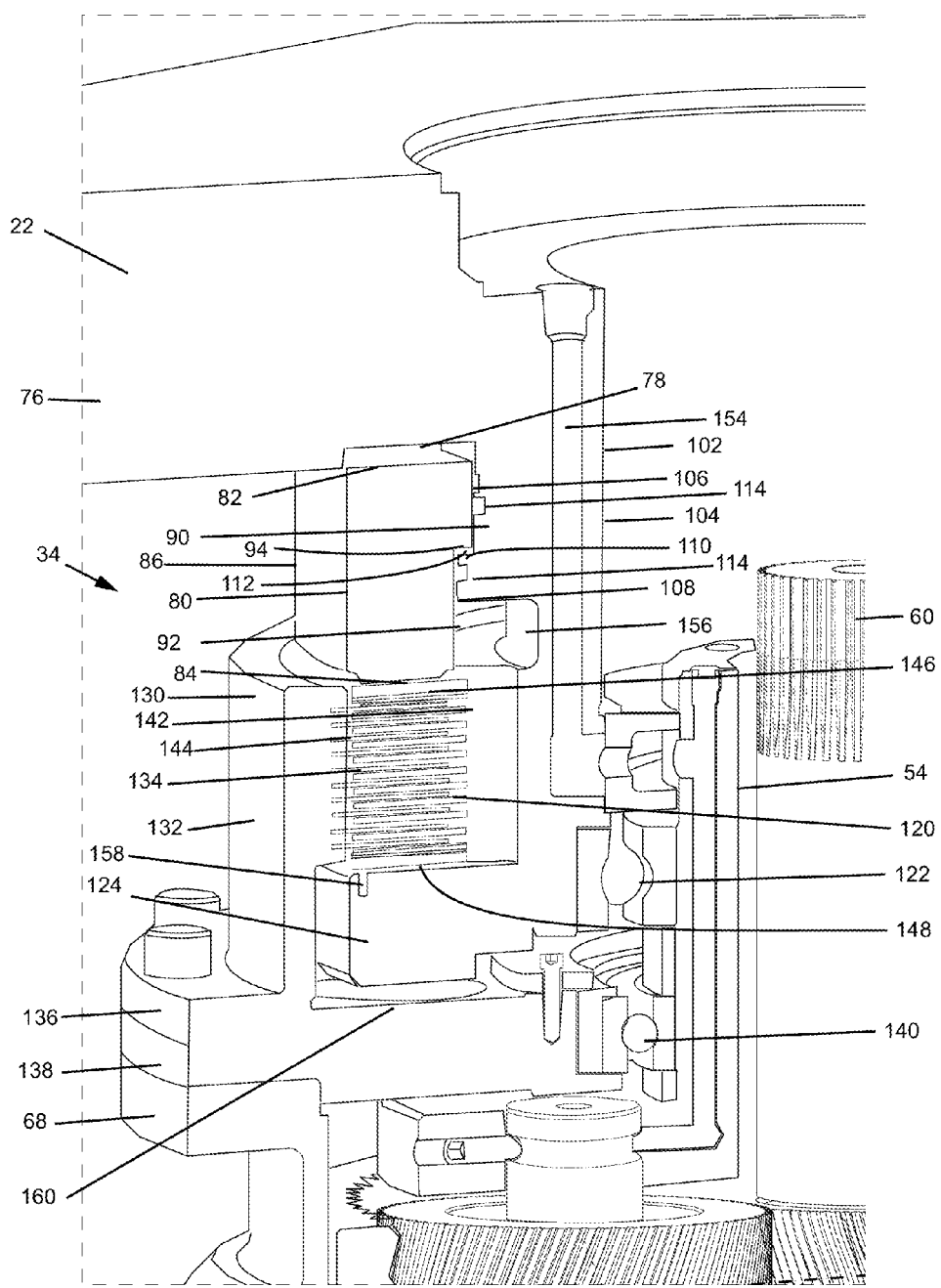
FIG. 2 shows an enlarged view taken from detail area 2-2 of FIG. 1.
Figure 3:
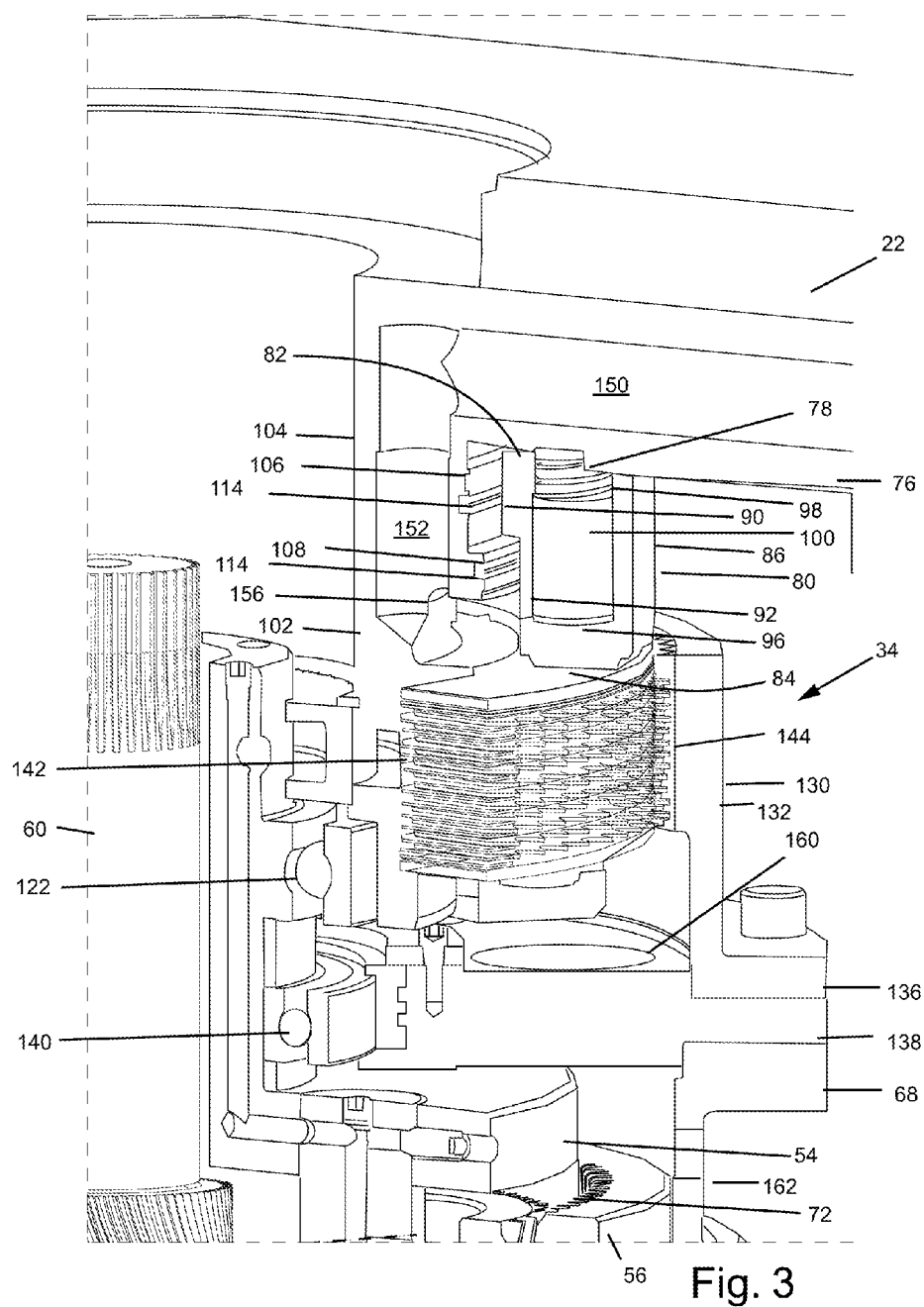
FIG. 3 shows an enlarged view taken from detail area 3-3 of FIG. 1.
Figure 4:
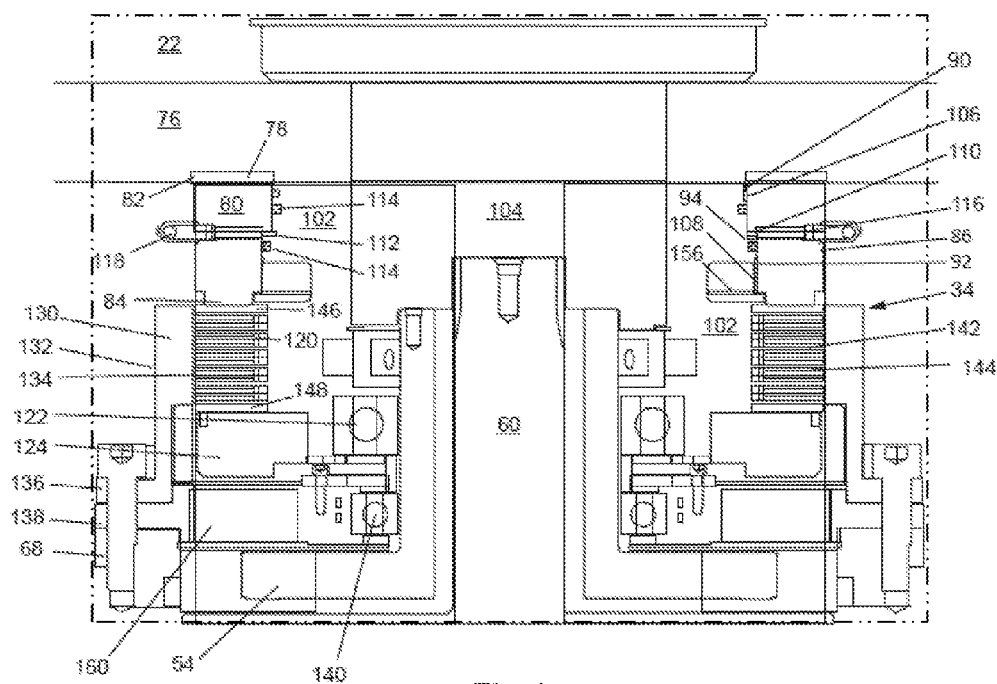
FIG. 4 is a cross-sectional view generally similar to both detail area 2-2 and detail 3-3 of FIG. 1.

The piston carrier 76 and the spline hub 102 may be formed with passageways 150, 152 (FIG. 3) to allow cooling oil to be drawn from the oil supply, filtration and pressurizing equipment. 46. The spline hub 102 may also have axial passages 154 (FIG. 2) formed therein that provide oil for lubrication for the planetary gear system. As best shown in FIG. 3, cooling oil for the clutch may be directed through a passageway 150 of the piston carrier 76 into the spline hub 102. The passageway 152 of the spline hub 102 may direct cooling oil to an oil supply groove 156 formed in a mid portion of the outer diameter of spline hub 102, for instance, between the inner and outer wall portions 106,108 and the axial extending splines 120. The cooling oil may then flow from the oil supply groove 156 axially through the splines 120 of the spline hub 102 and laterally between the clutch plates 142,144. Oil may then flow axially to the splines 134 of the spline coupling 130 to remove generated heat from the clutch assembly. Cooling oil may flow from the splines 134 of the spline coupling 130 to an area radially outward of the clutch assembly keeper plate 124. A seal 158 may be provided between the keeper plate 124 and the bottom of the clutch plate stack to prevent excessive oil flow from between the clutch plate stack and the keeper plate, and to direct oil flow to the splines 134 of the spline coupling 130. The bearing carrier 138 may have holes 160 formed therethrough to allow cooling oil passing through the splines 134 of the spline coupling 130 to be directed to the planet ring gear mesh 72, and then to return to the sump 40. The ring gear carrier 68 may also have holes 162 (FIG. 3) to direct oil to the sump.

The clutch 34 as described herein utilizes springs 98 to engage the clutch and hydraulic pressure to disengage the clutch. The springs 98 disposed in the recesses 96 of the piston 80 urge the piston into engagement with the pressure plates 146,148, and the pressure plates and the clutch plates 142,144 into engagement with each other and against the keeper plate 124. The clutch 34 locks the ring gear 56 and prevents the ring gear from rotating, thereby allowing the output shaft 58 to rotate. To stop rotation of the output shaft 58, hydraulic fluid pressure may be applied against the pressure of the springs 98. Consequently, the pressure plates 146,148 and the clutch plates 142,144, and the piston 80 and the keeper plate 124 may be disengaged from each other, thereby allowing the ring gear 56 to be effectively disengaged from the gear train. Accordingly, the clutch may maintain the gear train engaged with the motor and allow rotation of the driven equipment should the hydraulic system fail.

When the motor is started, it is generally started under a no-load condition. Prior to the motor start, hydraulic pressure is directed to the hydraulic chamber 112 to move the piston 80 against pressure of the springs 98 to disengage the clutch 34. The pressure application end 84 of the piston 80 releases and disengages the pressure plates 146,148 from the clutch plate stack, thereby effectively disengaging the ring gear 56 from the housing and allowing the ring gear to rotate. With the clutch 34 disengaged, the motor may be started. The ring gear 56 may rotate about the planet gears 52, which prevents rotation of the planet carrier 54 and the output shaft 58, and allows the motor to start under a no-load condition. As hydraulic pressure is removed from the hydraulic chamber 112 in a controlled fashion, pressure from the springs 98 may force the piston 80 into engagement with the clutch stack against the keeper plate, and friction from the clutch plates 142,144 may cause the ring gear 56 to slow down its rotation and thereafter allow the output shaft 58 to start rotation. When hydraulic fluid pressure is completely removed from the hydraulic chamber 112 and spring pressure fully forces the piston 80 into engagement with the clutch stack, the ring gear 56 may be effectively locked with the housing and all rotary motion of the gear train may be transferred to the output shaft 58. Slower speeds and overload protection are capable by pressurizing the hydraulic chamber 112 with hydraulic fluid to remove some of the force exerted by the springs 98 on the piston 80, thereby allowing the piston to move incrementally between the engaged and disengaged positions to effect gear train operation (e.g., speed, torque parameters) as desired. For instance, the amount of hydraulic fluid pressure applied to the hydraulic chamber 112 may be controlled to control output shaft speed and overload torque.

Because the clutch is engaged when the system is de-energized, a backstop, sprag clutch, or overrunning clutch may be used to prevent reverse rotation of the system in the event of a motor power failure and hydraulic system failure. The backstop, a sprag clutch, or an overrunning clutch (not shown) may be located on the motor, for example, on the opposite drive end of the motor shaft. This may eliminate the need to arrange an anti-rotation type device inside the gearbox or on the low speed shaft extension.

Although the drawings show the clutch mounted to a structural member of the housing, the clutch may be mounted to a flange of the drive end of the motor. The motor flange may cooperate with the housing top weldment plate and may define the hollow interior of the housing including the opening adjacent to the input shaft of the gear train. For instance, the motor flange may include any one or all of the following: the piston carrier, the hub, the coupling, the piston, the clutch plate stack, and the keeper plate. The motor flange may fully integrate the motor with the gearbox or the motor flange may be attached to the gear enclosure.

In view of the foregoing, it will be seen that the several advantages are achieved and attained. The embodiments were chosen and described in order to best explain practical applications to thereby enable others skilled in the art to best utilize the various embodiments and modifications as are suited to a particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A gear box comprising:
  a housing including structural members defining a hollow interior of the housing;
  a planetary gear train contained in the housing hollow interior, the planetary gear train comprising a sun pinion engaging at least one planet gear, the at least one planet gear being rotatably mounted to a planet gear carrier, the planet gear carrier being configured to drive an output shaft, the output shaft being configured to be operatively connected to a load, the at least one planet gear being configured to rotate within a ring gear; and
  a clutch comprising a hub and a coupling, the coupling being operatively mounted to the ring gear, the hub and the coupling each having a drive portion, the hub drive portion and coupling drive portion being movable relative to each other between an engaged position and a disengaged position, wherein in the engaged position, the hub drive portion and the coupling drive portion are engaged in a manner to allow torque to be transmitted between the hub and the coupling, wherein the disengaged position the hub drive portion and the coupling drive portion are spaced apart in a manner to prevent torque from being transmitted between the hub and the coupling, the clutch having an actuator configured to move the hub drive portion and the coupling drive portion between the engaged position and the disengaged position, wherein in moving the hub drive portion and the coupling drive portion to the engaged position, the actuator is driven by spring pressure exerted by at least one spring operatively bearing on the actuator, and wherein in moving the hub drive portion and the coupling drive portion to the disengaged position, the actuator is driven by hydraulic pressure operatively applied against the actuator sufficient to overcome the spring pressure exerted by the at least one spring;
  wherein the hub is operatively mounted to at least one structural member of the housing.

2. The gear box of claim 1 wherein the actuator is circumsuperjacent to the hub.

3. The gear box of claim 1 wherein the at least one spring is disposed between the structural member to which the hub is mounted and the actuator.

4. The gear box of claim 1 wherein the hydraulic pressure is directed between the hub and the actuator in moving the hub drive portion and the coupling drive portion to the disengaged position.

5. The gear box of claim 4 wherein the actuator has an inner diameter with inward and outward cylindrical surfaces radially spaced from one another and the hub has an outer diameter with inward and outward cylindrical surfaces radially spaced from one another, and the actuator inward cylindrical surface is adjacent to the hub inward cylindrical surface and the actuator outward cylindrical surface is adjacent to the hub outward cylindrical surface.

6. A gear box comprising:
  a housing including structural members defining a hollow interior of the housing;
  a planetary gear train contained in the housing hollow interior, the planetary gear train comprising a sun pinion engaging at least one planet gear, the at least one planet gear being rotatably mounted to a planet gear carrier, the planet gear carrier being configured to drive an output shaft, the output shaft being configured to be operatively connected to a load, the at least one planet gear being configured to rotate within a ring gear; and
  a clutch comprising a hub and a coupling, the coupling being operatively mounted to the ring gear, the hub and the coupling each having a drive portion, the hub drive portion and coupling drive portion being movable relative to each other between an engaged position and a disengaged position, wherein in the engaged position, the hub drive portion and the coupling drive portion are engaged in a manner to allow torque to be transmitted between the hub and the coupling, wherein the disengaged position the hub drive portion and the coupling drive portion are spaced apart in a manner to prevent torque from being transmitted between the hub and the coupling, the clutch having an actuator configured to move the hub drive portion and the coupling drive portion between the engaged position and the disengaged position, wherein in moving the hub drive portion and the coupling drive portion to the engaged position, the actuator is driven by spring pressure exerted by at least one spring operatively bearing on the actuator, and wherein in moving the hub drive portion and the coupling drive portion to the disengaged position, the actuator is driven by hydraulic pressure operatively applied against the actuator sufficient to overcome the spring pressure exerted by the at least one spring;

wherein the hydraulic pressure is directed between the hub and the actuator in moving the hub drive portion and the coupling drive portion to the disengaged position;

wherein the actuator has an inner diameter with inward and outward cylindrical surfaces radially spaced from one another and the hub has an outer diameter with inward and outward cylindrical surfaces radially spaced from one another, and the actuator inward cylindrical surface is adjacent to the hub inward cylindrical surface and the actuator outward cylindrical surface is adjacent to the hub outward cylindrical surface; and wherein the hydraulic pressure is directed to a space between the inward cylindrical surface of the hub and the outward cylindrical surface of the actuator.

7. The gear box of claim 6 wherein the hydraulic pressure is directed through at least one port formed in actuator.

8. A gear box comprising:
a housing including structural members defining a hollow interior of the housing;
a planetary gear train contained in the housing hollow interior, the planetary gear train comprising a sun pinion engaging at least one planet gear, the at least one planet gear being rotatably mounted to a planet gear carrier, the planet gear carrier being configured to drive an output shaft, the output shaft being configured to be operatively connected to a load, the at least one planet gear being configured to rotate within a ring gear; and
a clutch comprising a hub and a coupling, the coupling being operatively mounted to the ring gear, the hub having at least one hub clutch plate and the coupling having at least one coupling clutch plate, the at least one hub clutch plate and the at least one coupling clutch plate being movable relative to each other between an engaged position and an disengaged position, wherein in the engaged position, the at least one hub clutch plate and the at least one coupling clutch plate are engaged in a manner to prevent rotation of the ring gear, wherein the disengaged position the at least one hub clutch plate and the at least one coupling clutch plate are spaced apart in a manner to allow rotation of the ring gear, the clutch having an actuator configured to move the at least one hub clutch plate and the at least one coupling clutch plate between the engaged position and the disengaged position, wherein in moving the at least one hub clutch plate and the at least one coupling clutch plate portion to the engaged position, the actuator is driven by spring pressure exerted by at least one spring operatively bearing on the actuator, and wherein moving the at least one hub clutch plate portion and the at least one coupling clutch plate to the disengaged position, the actuator is driven by hydraulic pressure operatively applied against the actuator sufficient to overcome the spring pressure exerted by the at least one spring;

wherein the hub is operatively mounted to at least one structural member of the housing.

9. The gear box of claim 8 wherein the hub has a channel configured to deliver lubricating oil to the at least one hub clutch plate and the at least one coupling clutch plate.

10. The gear box of claim 9 wherein the hub has a plurality of splines circumferentially spaced about the hub and extending axially on the hub.

11. The gear box of claim 10 wherein the splines of the hub engage the at least one hub clutch plate in a manner to allow lubricating oil to flow therethrough.

12. The gear box of claim 11 wherein the coupling has a plurality of splines circumferentially spaced about the coupling and axially extending on the coupling.

13. The gear box of claim 12 wherein the splines of the coupling engage the at least one coupling clutch plate in a manner to allow lubricating oil to flow therethrough.

14. The gear box of claim 13 wherein the clutch is configured to direct lubricating oil flowing to the at least one hub clutch plate and the at least one coupling clutch plate to a sump formed in the housing interior.

15. A gear box comprising:
a housing with a hollow interior;
a planetary gear train contained in the housing hollow interior, the planetary gear train comprising a sun pinion engaging at least one planet gear, the at least one planet gear being rotatably mounted to a planet gear carrier, the planet gear carrier being configured to drive an output shaft, the output shaft being configured to be operatively connected to a load, the at least one planet gear being configured to rotate within a ring gear; and
a clutch comprising a hub and a coupling, the coupling being operatively mounted to the ring gear, the hub having at least one hub clutch plate and the coupling having at least one coupling clutch plate, the at least one hub clutch plate and the at least one coupling clutch plate being movable relative to each other between an engaged position and an disengaged position, wherein in the engaged position, the at least one hub clutch plate and the at least one coupling clutch plate are engaged in a manner to allow rotation of the output shaft, wherein the disengaged position the at least one hub clutch plate and the at least one coupling clutch plate are spaced apart in a manner to prevent rotation of the output shaft, the clutch having an actuator configured to move the at least one hub clutch plate and the at least one coupling clutch plate between the engaged position and the disengaged position, wherein in moving the at least one hub clutch plate and the at least one coupling clutch plate portion to the engaged position, the actuator is driven by spring pressure exerted by at least one spring operatively bearing on the actuator, and wherein moving the at least one hub clutch plate portion and the at least one coupling clutch plate to the disengaged position, the actuator is driven by hydraulic operatively applied against the actuator sufficient to overcome the spring pressure exerted by the at least one spring;

wherein the hub is operatively mounted to at least one structural member of the housing.

16. The gear box of claim 15 wherein the housing has an opening for an input shaft of the gear box and an opening for the output shaft.

17. The gear box of claim 16 wherein the hub is mounted to at least one structural member of the housing adjacent to the input shaft opening.

18. The gear box of claim 17 wherein the actuator is circumsuperjacent to the hub.

19. The gear box of claim 18 wherein the at least one structural member of the housing to which the hub is mounted has an annular groove.

20. The gear box of claim 19 wherein the actuator is configured to reciprocate in the annular groove of the at least one structural member.

21. The gear box of claim 20 wherein the at least one spring operatively bears on the actuator and the annular groove of the at least one structural member.

22. The gear box of claim 21 wherein the actuator is intermediate of the at least one spring, and the at least one hub clutch plate and the at least one coupling clutch plate.

23. The gear box of claim 22 wherein the hydraulic pressure is directed to a space formed between the hub and the actuator intermediate of the annular groove of the at least one structural member and the at least one hub clutch plate and the at least one coupling clutch plate.

24. The gear box of claim 16 further comprising a motor vertically mounted to the housing adjacent to the input shaft opening.

* * * * *